United States Patent [19]
Vidal

[11] 3,979,556
[45] Sept. 7, 1976

[54] SCANNING CONTROL ARRANGEMENT FOR A TELECINE SYSTEM USING A FLYING SPOT TUBE

[75] Inventor: Serge Vidal, Paris, France

[73] Assignee: Thomson-CSF, Paris, France

[22] Filed: Jan. 29, 1974

[21] Appl. No.: 437,662

[30] Foreign Application Priority Data
Feb. 2, 1973 France .............................. 73.03715

[52] U.S. Cl. ..................... 178/7.2; 178/DIG. 28
[51] Int. Cl.² .......................................... H04N 3/36
[58] Field of Search ................ 178/DIG. 28, 6.7 A, 178/7.7, 7.2; 398/6, 8, 54; 250/549; 315/370, 371

[56] References Cited
UNITED STATES PATENTS

| | | | |
|---|---|---|---|
| 2,818,466 | 12/1957 | Larson | 178/DIG. 28 |
| 2,929,956 | 3/1960 | Jacobs et al. | 250/549 |
| 3,267,212 | 8/1966 | Goldmark et al. | 178/DIG. 28 |
| 3,333,058 | 7/1967 | Goldmark et al. | 178/DIG. 28 |
| 3,340,359 | 4/1964 | Fredkin | 178/DIG. 28 |
| 3,358,184 | 12/1967 | Vitt, Jr. | 178/7.2 |
| 3,378,635 | 4/1968 | Goldmark et al. | 178/DIG. 28 |
| 3,447,026 | 5/1969 | Townsend | 250/549 |
| 3,693,042 | 9/1972 | Fredkin et al. | 178/7.7;DIG. 28 |

Primary Examiner—Robert L. Griffin
Assistant Examiner—Aristotelis M. Psitos
Attorney, Agent, or Firm—Cushman, Darby & Cushman

[57] ABSTRACT

In a telecine system using a flying spot tube, the latter is used for scanning, at the same time as the film, marker zones delivering, upon being scanned, marker signals characteristic of the vertical position of the horizontal line on which they are located. The marker signals are converted into electrical signals for comparison with a reference signal; the resultant output signal is used for correcting the vertical deflection of the flying spot. The marker zones may be scanned either by an image of the flying spot distinct from that which scan the film, or by the same image.

8 Claims, 6 Drawing Figures

SCANNING CONTROL ARRANGEMENT FOR A TELECINE SYSTEM USING A FLYING SPOT TUBE

The present invention relates to an arrangement for carrying out correct scanning of a surface delimited by a fixed frame, when using a flying spot tube.

The problem with which the present invention is concerned arises in particular in telecine equipment involving continuous film displacement and using a flying spot tube.

The basic problem in telecine equipment, whether employing interlaced scanning or not, is that of making a spot image effect correct vertical-scanning of a moving film image.

It is well known to provide control systems which link the film displacement with the scanning function performed by the flying spot tube.

The present invention, in particular, provides an advantageous solution to the problem in the situation where a pivoting mirror is used to project the spot image onto the surface being scanned, with the proviso that the problem is split into two parts: the control of the film motion in order to achieve correct positioning, as a function of time, of the film relatively to a fixed scanning frame, and the control of the vertical sweep of the flying spot tube in order to effect correct scanning of the surface contained within this fixed frame.

The present invention makes it possible to achieve this correct scanning with very high accuracy.

According to the invention, there is provided an arrangement for controlling the vertical deflection of the spot in a flying spot tube having vertical deflection means in order to effect correct optical scanning line by line, of a surface within a fixed frame, said arrangement comprising: fixed or stationary marker zones located for being scanned by an image of said spot during said optical scanning, said marker zones being designed for supplying, when scanned by said image of said spot, optical marker signals which are characteristic of the position, in the vertical scanning direction, of the line being scanned within said fixed frame; a converter for converting said marker signals into electrical signals; a reference signal generator; a circuit for receiving the signals from said converter and from said reference signal generator and for delivering an error signal; and means coupled to said circuit and to said vertical deflection means for correcting said vertical deflection.

It should be pointed out that it is well known to utilise for electronic scanning purposes, marker zones associated with a fixed frame which make it possible to centre a field within the fixed frame; however those marker zones do not provide any check upon the uniformity of the scanning motion.

The invention will be better understood and other of its features rendered apparent, from a consideration of the ensuing description which is given by way of non-limitative example with reference to the appended drawing in which:

FIG. 1 is a simplified partial diagram of a telecine system comprising a device in accordance with the invention, in which the marker zones are arranged on a target separate from the scanner window;

FIGS. 2 and 3 provide more detailed illustrations of elements shown in FIG. 1;

Figure 1:
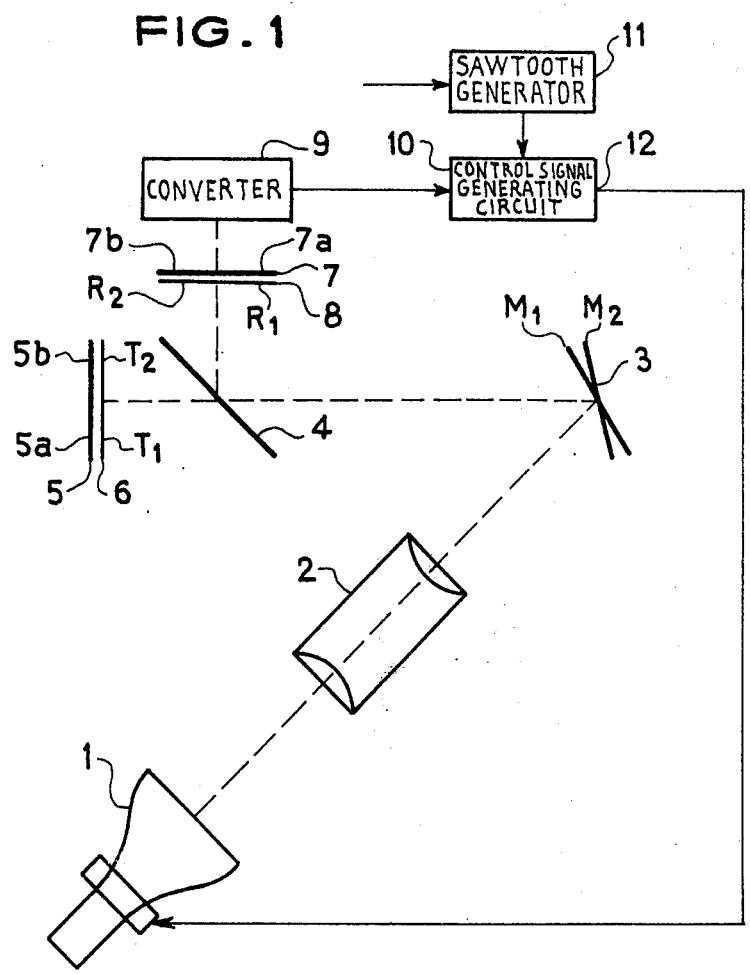

The invention will be described by way of non-limitative example, in the context of interlaced scanning in a telecine system, and more particularly in the context of an anamorphotic scanning operation achieved using a mirror tripped between two fixed positions $M_1$ and $M_2$, the mirror remaining on each fixed position for the time taken to scan a field, and passing from one position to the other during the vertical blanking time interval of the video signals, under the control of an electromechanical device operated at the field frequency and not shown in the drawing.

In the following, the devices for driving the film, for converting light to electrical current and for processing the signals, have been neither illustrated nor described since they are not directly concerned in the invention and can be materialised using any known method.

FIG. 1 illustrates a flying spot tube 1, the "horizontal" or line sweep direction of which is normal to the plane of the drawing, an objective lens 2 and a scanning window 5; the latter may be considered as composed of two identical parts 5a and 5b; within the frame of the scanning window, the image of the flying spot produced with the help of the objective lens 2 and a mirror 3 tripped between two terminal positions $M_1$ and $M_2$, defines two adjacents fields $T_1$ and $T_2$ forming a "pattern" 6. These fields $T_1$, $T_2$, in their correct positions, respectively occupy the window parts 5a and 5b. The pattern 6 has been shown in front of the window 5, and not in its plane, simply in order to clarify the drawing.

A splitting mirror 4, inclined at 45° to an axis perpendicular at its centre to the window 5, deflects a small part of the light beam issuing from the spot of the tube 1, onto a fixed or stationary target 7 arranged in a plane which is symmetrical to the plane of the window 5 considered in relation to the plane of the mirror 4 and comprises two identical adjacent portions 7a and 7b. A "pattern" 8, made up of two fields $R_1$, $R_2$, is thus produced upon the target. These fields $R_1$ and $R_2$, when the fields $T_1$ and $T_2$ are correctly positioned at 5a and 5b, respectively occupy the portions 7a and 7b of the target. Again, the pattern has been shown offset in relation to the target 7, in order to simplify the drawing.

Figure 2:
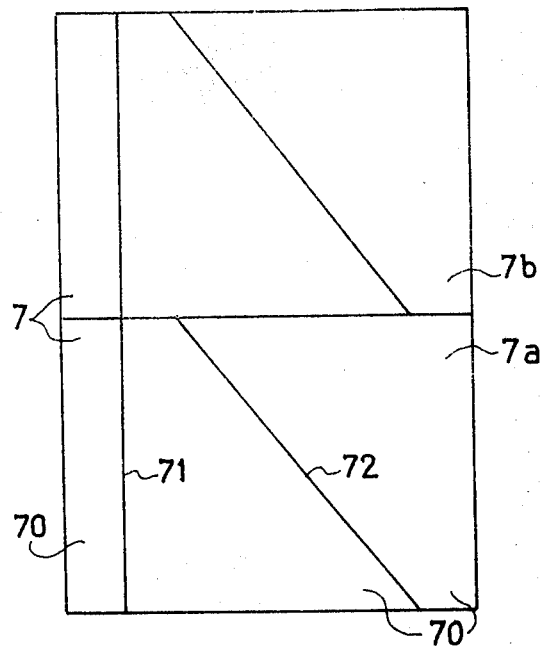

The target 7, a description of which will be given with reference to FIG. 2, is scanned in the same way as the film and produces light information on the height of the scanning lines which information is converted into an electrical signal by a converter 9 comprising a photoelectric cell and an amplifier.

The output signal from the converter 9 is applied to one input of a control signal generating circuit 10 whose other input receives the output signal from a sawtooth generator 11. The circuit 10, which will be described in more detail making reference to FIG. 3, produces at its output 12 an output signal which is utilised to control the vertical sweep of the flying spot.

FIG. 2 illustrates, in a plane perpendicular to the plane of FIG. 1, the two identical portions 7a and 7b of the target 7.

To simplify the description, the following explanations will be given with reference to the bottom part 7a of the target, it being understood that the two parts of the target operate in the same way.

The bottom part comprises an opaque plate 70 in which there are formed marker zones formed by two fine, transparent slots, one vertical 71 and the other oblique 72. Self-evidently, throughout these descriptions, the term vertical is employed in the field-scanning sense, generally referred to as vertical scanning, irrespective of the orientation of the fields.

For each line of the plate which is swept by the image of the flying spot, there will thus be produced two pulses at the output of the converter 9, FIG. 1. The principle of operation is based upon the measurement of the time interval separating the second pulse from the first, which time interval can readily be proven to define unambiguously the height of the scanned line on the target, and consequently the height of the corresponding scanned line in the scanning window.

The reference provided by the vertical line makes the measurements independent from any horizontal shift of the pattern 8 relatively to the target 7.

The parasitic effects of amplitude and speed variations in the horizontal sweep are not avoided, but are negligible and, moreover, it is possible to reduce the corresponding measurement errors, either by increasing the number of oblique lines in the target or by using a different configuration of the marker zones; an example will be indicated in a variant embodiment.

Figure 3:
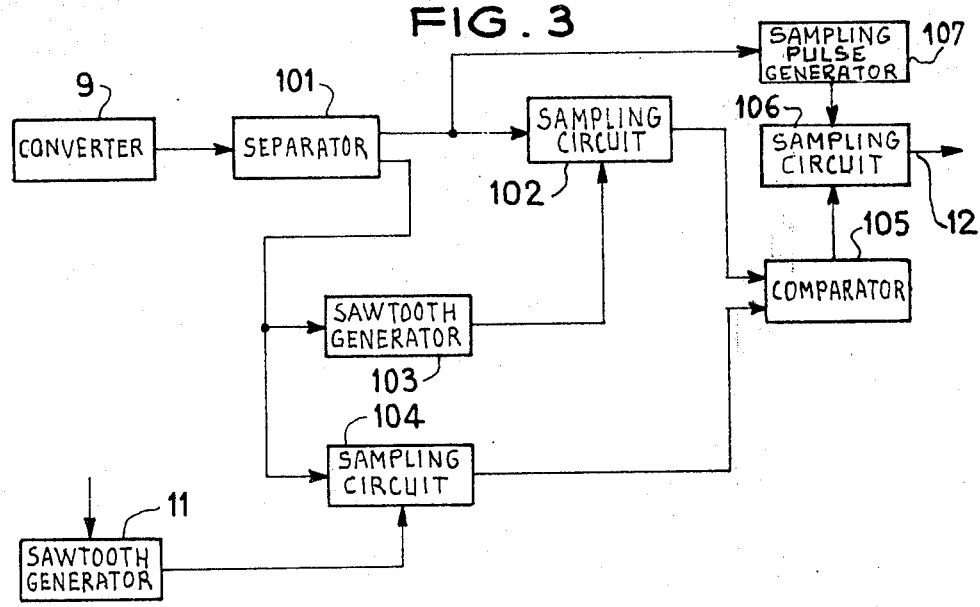

FIG. 3 is the diagram of an example of a circuit for controlling the vertical sweep of the flying spot as a function of the optical signals produced by the target. This drawing illustrates, in addition to the converter 9 and the sawtooth generator 11 of FIG. 1, seven elements, 101 to 107, forming part of the circuit 10 of FIG. 1.

The two video pulses $V_1$ and $V_2$ obtained with each scanned line, at the output of the converter 9, are separated in a separator circuit 101. The first pulse $V_1$, corresponding to the vertical slot 71, is used to control the production, by a triggered generator 103, of a sawtooth signal at the line frequency of the flying spot tube.

The second pulse $V_2$ is processed by a sampling circuit 102 which samples the sawtooth signal from the generator 103 at the instant at which a pulse $V_2$ appears and stores the sampled value until the appearance of the next pulse $V_2$, the stored value being the output signal of the sampling circuit. The circit 102 can be constituted by a transistor which is normally blocked and is driven conductive by the $V_2$ pulses and, for the time during which it is conductive, applies the sawtooth voltage to the terminals of an output capacitor.

The output signal from the circuit 102 is thus a stepped signal, the height of the $n^{th}$ step ($n = 1, 2, 3 . . .$) being a function of the height of the $n^{th}$ scanned line on the target portion 7a and therefore of the height of the corresponding scanned line in the window part 5a.

If the scanned lines are regularly spaced, a pulse $V_2$ will be separated from the corresponding pulse $V_1$ by a time interval which, from one line to the next, increases by a constant value. If, on the other hand, the field displaces while a line is being scanned, the corresponding error will recur in all the ensuing steps of the output signal from the circuit 102 for the considered field.

This error is measured by comparing the output signal from the circuit 102 with a stepped signal produced by the sampling, in a sampling circuit 104 similar to that 102, of the sawtooth signal delivered by the generator 11, the sampling pulses being the pulses $V_1$ delivered by the separator circuit 101. The generator 11 is triggered by the pulses used to control the vertical sweep in the flying spot tube. These pulses, as well as the slope of the sawtooth signal, are chosen so that the height of the $n^{th}$ step ($n = 1, 2, 3 . . .$) of the output signal from the circuit 104, corresponds to the height of the $n^{th}$ step of the output signal from the circuit 102, when the height of the $n^{th}$ scanned line on the target corresponds to the required height of the $n^{th}$ scanned line in the window part 5a.

To carry out interlaced scanning, it is merely necessary for the spot on the tube itself to effect interlaced scanning, the pulses triggering the generator 11 at the field frequency, being the same as those which trigger the vertical sweep of the tube.

The output signals from the circuits 102 and 104 are applied to the two inputs of a voltage comparator 105. The output signal from the comparator 105 is sampled in a sampling circuit 106, similar to the sampling circuits 102 and 104.

The sampling pulses for the sampling circuit 106 are supplied by a sampling pulse generator 107, which is triggered by the trailing edges, of the pulses $V_2$, and delivers for each of them a pulse of a duration sufficiently small (in the order of 5 $\mu$ s) for the output voltage from the comparator to be sampled only when the two compared voltages in the comparator 105 pertain to one and the same scanned line.

Each sampled value of the output voltage from the comparator 105 is stored in the capacitor of the sampling circuit 106 until the next sampling period.

The output signal from the sampling circuit 106 is added to the vertical sweep signal applied to the vertical deflection coil of the tube, this being symbolically shown in FIG. 1 by a simple connection between the output 12 of the circuit 10 and the deflecting yoke of the tube.

The response rate and the sampling frequency of the loop, make it possible to achieve the desired accuracy.

The device has various advantages:

the accuracy of positioning is no longer tied to mechanical displacements and only involves electronic circuits;

the sole function of the mirror is to maintain the mean position of the flying spot tube field on the optical axis of the lens;

the design of the mobile equipment can therefore be very substantially simplified.

the extreme positions of the mirror displacement are not submitted to stringent conditions of accuracy.

The control device in accordance with the invention could of course equally be employed in telecine systems where, for non-anamorphotic scanning of the film, a pivoting mirror has a continuous motion from a position $M_1$ to a position $M_2$ and returns to the position $M_1$ during the vertical blanking time intervals.

Variant embodiments of the invention may be used, in which comparison is effected either several times per line or continuously. Thus, it is possible to utilise targets supplying several pieces of information per line, for example using several oblique slots and this furthermore results in an increase in the accuracy of the device.

Figure 4:
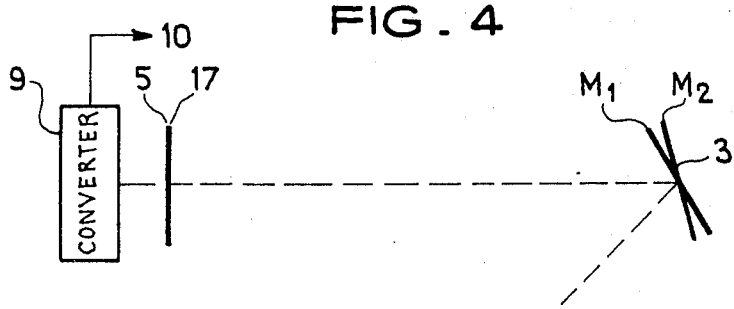
FIGS. 4 and 5 are details pertaining to a variant embodiment of the device in accordance with the invention, in which the marker zones are arranged along the scanner window.
Figure 5:
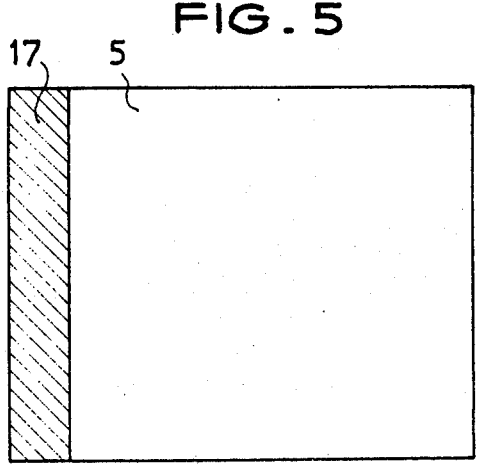

Moreover, the measurement of the position of the scanned lines by an analogue technique using a sawtooth signal, could equally well be effected digitally using a reference target upon which there is recorded, in a suitable code, a vertical scale that, with each passage of a scanned line, gives the ordinate of the latter. This method has the advantage of relieving the measurement of the aforesaid parasitic effects due to sweep variations in the horizontal direction. On the other hand, a target of this kind can be arranged at one side of the film scanning window. FIGS. 4 and 5 illustrate this kind of arrangement.

FIG. 4 illustrates the mirror 3 and the scanning window 5 associated with the target 17; the converter 9 receives the light from the spot, which has passed through the target 17; the splitting mirror 4 of FIG. 1 is therefore discarded and, for the same light beam coming from the mirror 3, the amount of light received by the target 17 is greater than that received by the target 7 of FIG. 1.

FIG. 5 illustrates an embodiment of the scanning window 5 associated with the target 17. The target 17 comprises horizontal arrays, not drawn in, of opaque and transparent portions; the transparent portions, for example, represent the digit 1 and, with the opaque portions, form a vertical reference scale; to avoid problems which might arise with read-out, the code used will preferably be the GRAY code.

Figure 6:
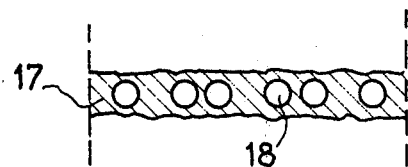
FIG. 6 is a detail of FIG. 5.

FIG. 6 illustrates on a much enlarged scale, one of the horizontal arrays constituting one of the steps of the reference scale of the target 17 shown in FIG. 5; the opaque portions are constituted by solid parts of the target and the transparent portions by perforations such as the hole 18.

The pitch of the reference scale must obviously be compatible with the desired precision. Thus a target has been produced whose scale, formed in 10-digit binary code by horizontal successions of opaque and transparent zones, gives a pitch equal to one-third of the line interval of a scanning field. The coded scanning pulses are either decoded and compared with a reference sawtooth signal, or directly compared in digital form with a reference code; in the first case, the analogue signal resulting from the comparison operation is sampled and processed in the same manner as before; in the second case, the digital result of the comparison operation can be converted into an analogue signal in order to form the error voltage used to correct the vertical scanning of the flying spot tube.

Of course, the invention is not limited to the embodiments described and shown which were given solely by way of examples.

What is claimed is:

1. An arrangement for controlling the vertical deflection of the spot in a flying spot tube having vertical deflection means, in order to effect correct optical scanning, line by line, of a surface within a fixed frame, said arangement comprising: stationary marker zones located for being scanned by an image of said spot during said optical scanning, said marker zones being designed for supplying, when scanned by said image of said spot, optical marker signals which are characteristic of the position, in the vertical scanning direction, of the line being scanned within said fixed frame; a converter for converting said marker signals into electrical signals; a reference signal generator; a circuit for receiving the signals from said converter and from said reference signal generator and for delivering an error signal characteristic of said position; and means coupled to said circuit and to said vertical deflection means for correcting said vertical deflection as a function of said position.

2. An arrangement as claimed in claim 1, comprising a fixed target upon which said marker zones are arranged, and an optical device for forming said image of the spot for scanning said marker zones, and a further image of said spot for effecting said optical scanning of said surface.

3. An arrangement as claimed in claim 1, wherein said marker zones are arranged at one side of said fixed frame and wherein said image of said spot also effects said scanning of said surface.

4. An arrangement as claimed in claim 1, wherein said marker zones comprise opaque and transparent portions.

5. An arrangement as claimed in claim 4, wherein said transparent portions comprise a vertical line and at least one oblique line.

6. An arrangement as claimed in claim 4, wherein said marker zones form a vertical scale graduated in the Gray binary code.

7. An arrangement as claimed in claim 2, wherein said optical device comprises a splitting mirror for deflecting toward said target part of the light coming from said spot.

8. An arrangement as claimed in claim 1, for a telecine system wherein said optical scanning is achieved at the field frequency of said telecine system, wherein said reference signal generator is a generator for producing sawtooth signals at the field frequency of said optical scanning, and wherein said circuit comprises a sampling circuit for sequentially sampling, at instants determined by said marking signals, the output signals from said generator and storing, between two successive sampling operations, the amplitude of the last signal sampled.

* * * * *